(12) United States Patent
Takeshita et al.

(10) Patent No.: US 12,034,628 B2
(45) Date of Patent: Jul. 9, 2024

(54) NETWORK CONTROLLER DEVICE, NETWORK CONTROL SYSTEM, CONTROL METHOD FOR CONTROLLING COMMUNICATION NETWORK AND PROGRAM

(71) Applicant: Nippon Telegraph and Telephone Corporation, Tokyo (JP)

(72) Inventors: Erina Takeshita, Musashino (JP); Hideaki Kimura, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 303 days.

(21) Appl. No.: 17/431,560

(22) PCT Filed: Feb. 7, 2020

(86) PCT No.: PCT/JP2020/004742
§ 371 (c)(1),
(2) Date: Aug. 17, 2021

(87) PCT Pub. No.: WO2020/170850
PCT Pub. Date: Aug. 27, 2020

(65) Prior Publication Data
US 2022/0141124 A1 May 5, 2022

(30) Foreign Application Priority Data
Feb. 20, 2019 (JP) ................................ 2019-028558

(51) Int. Cl.
*H04L 43/0823* (2022.01)
*H04L 43/0894* (2022.01)
(Continued)

(52) U.S. Cl.
CPC ........ *H04L 45/123* (2013.01); *H04L 43/0823* (2013.01); *H04L 43/0894* (2013.01); *H04L 45/22* (2013.01)

(58) Field of Classification Search
CPC .............. H04L 45/123; H04L 43/0823; H04L 43/0894; H04L 45/22; H04L 43/20; H04L 43/0829; H04L 43/0852
See application file for complete search history.

(56) References Cited

U.S. PATENT DOCUMENTS

| 2005/0108444 A1* | 5/2005 | Flauaus | H04L 41/0894 |
| | | | 710/15 |
| 2016/0021005 A1* | 1/2016 | Kiyose | H04L 45/66 |
| | | | 370/401 |
| 2018/0131615 A1* | 5/2018 | Zhang | H04L 45/50 |

FOREIGN PATENT DOCUMENTS

| JP | 2008092154 A * | 4/2008 | |
| JP | 2020017903 A * | 1/2020 | ......... H04L 41/0816 |
| WO | WO-2010001795 A1 * | 1/2010 | ............. H04L 45/00 |

OTHER PUBLICATIONS

[No Author Listed], "ONUG Software-Defined WAN Use Case," ONUG SD-WAN Working Group, Oct. 2014, 10 pages.

* cited by examiner

*Primary Examiner* — Shailendra Kumar
(74) *Attorney, Agent, or Firm* — Fish & Richardson P.C.

(57) ABSTRACT

An object of the present disclosure is to enable efficient route assignment that guarantees a communication quality for each path between end terminals even if a state of a communication network varies.
The present disclosure is a network controller apparatus connected to a communication network that performs data communication between end terminals by using a plurality of paths. The network controller apparatus stores log infor- (Continued)

mation about a communication state for each path collected from the communication network, determines whether there is a path with a deteriorated communication quality on the basis of the log information, if there is a deteriorated path, determines whether there is a path in which a communication quality between end terminals utilizing the deteriorated path can be guaranteed, from among other paths available to the end terminals utilizing the deteriorated path, and if the communication quality cannot be guaranteed, calculates a new route in which the communication quality between the end terminals utilizing the deteriorated path can be guaranteed, and switches the deteriorated path to a path on the new route.

12 Claims, 15 Drawing Sheets

(51) Int. Cl.
*H04L 45/00* (2022.01)
*H04L 45/12* (2022.01)

[6]

[10]

| LINK | | PATH NUMBER | DISCARDED PACKETS COUNT [pkt/s] | TRAFFIC FLOW AMOUNT [Mbps] | LOG ACQUISITION TIME |
|---|---|---|---|---|---|
| RELAY APPARATUS NUMBER/PORT NUMBER | RELAY APPARATUS NUMBER/PORT NUMBER | | | | |
| RELAY APPARATUS 13/PORT #2 | RELAY APPARATUS 14/PORT #1 | PATH 10001 | 50 | 10 | 2018-12-25 03:09:00+09:00 |
| | | PATH 30001 | 100 | 1 | 2018-12-25 03:09:00+09:00 |
| | | ... | ... | ... | |
| RELAY APPARATUS 25/PORT #2 | RELAY APPARATUS 26/PORT #1 | PATH 10002 | 20 | 5 | 2018-12-25 03:09:00+09:00 |
| | | PATH 30002 | 5 | 1 | 2018-12-25 03:09:00+09:00 |
| | | ... | ... | ... | |

| LINK | | PATH NUMBER | DISCARDED PACKETS COUNT [pkt/s] | TRAFFIC FLOW AMOUNT [Mbps] | LOG ACQUISITION TIME |
|---|---|---|---|---|---|
| RELAY APPARATUS NUMBER/PORT NUMBER | RELAY APPARATUS NUMBER/PORT NUMBER | | | | |
| RELAY APPARATUS 13/PORT #2 | RELAY APPARATUS 14/PORT #1 | PATH 10001 | 50 | 10 | 2018-12-25 04:09:00+09:00 |
| | | PATH 30001 | 100 | 1 | 2018-12-25 04:09:00+09:00 |
| | | ... | ... | ... | |
| RELAY APPARATUS 25/PORT #2 | RELAY APPARATUS 26/PORT #1 | PATH 10002 | 1500 | 5 | 2018-12-25 04:09:00+09:00 |
| | | PATH 30002 | 500 | 100 | 2018-12-25 04:09:00+09:00 |
| | | ... | ... | ... | |

| PATH | ROUTE | RELAY APPARATUS/PORT |
|---|---|---|
| 10001 | 1001 | RELAY APPARATUS 13/#2, RELAY APPARATUS 14/#1 |
| 10002 | 2001 | RELAY APPARATUS 23/#2, RELAY APPARATUS 24/#1 |
| ... | | |

Fig. 15

NETWORK CONTROLLER DEVICE, NETWORK CONTROL SYSTEM, CONTROL METHOD FOR CONTROLLING COMMUNICATION NETWORK AND PROGRAM

CROSS-REFERENCE TO RELATED APPLICATIONS

This application is a National Stage application under 35 U.S.C. § 371 of International Application No. PCT/JP2020/004742, having an International Filing Date of Feb. 7, 2020, which claims priority to Japanese Application Serial No. 2019-028558, filed on Feb. 20, 2019. The disclosure of the prior application is considered part of the disclosure of this application, and is incorporated in its entirety into this application.

TECHNICAL FIELD

The present disclosure relates to a network controller apparatus, a network control system, a communication network control method, and a program.

BACKGROUND ART

Software Defined-Wide Area Network (SD-WAN) is a technique for flexibly controlling a wide area network (WAN) with software (see, for example, Non Patent Literature 1). Non Patent Literature 1 describes 10 technical requirements for the SD-WAN. Note that although the technical requirements are defined, a specific means of realizing the SD-WAN is not defined.

One of the technical requirements is that "various WAN lines are to be controlled in an active-active configuration". To satisfy this condition, a configuration in which a plurality of WAN lines (hereinafter, "paths") are managed in an SD-WAN end terminal (hereinafter, "end terminal") is generally employed.

FIG. 1 is a diagram illustrating an example of a path management between end terminals. In FIG. 1, a plurality of paths (a path #1 and a path #2) are managed between two end terminals 101 and 102. A means of realizing the path management includes a control method in which a packet is transmitted and received in each path between the end terminals 101 and 102 to understand a communication quality (a latency time, a jitter value, and the number of packet losses) of the path to decide how much traffic is transferred in which path. For example, in such a control method, the end terminals 101 and 102 switch all or some of communication from the path #1 to the path #2 if an increase in number of packet losses is measured in the path #1, and thus, a communication quality between the end terminals 101 and 102 is maintained. In addition, an SD-WAN controller 300 controls the end terminal 101 and the end terminal 102. The SD-WAN controller 300 is managed by a user holding the end terminal 101 and the end terminal 102.

Also, another one of the technical requirements is that "hybrid WAN with high availability and flexibility can be configured". To satisfy this condition, a configuration in which each path is assigned to a different route on a communication network is generally employed.

FIG. 2 is a diagram illustrating routes between end terminals in the SD-WAN. In FIG. 2, there are a route #1 passing through a communication network 51 and a route #2 passing through a communication network 52. The path #1 and the path #2 managed between the end terminals 101 and 102 are assigned to the route #1 and the route #2, respectively. For example, the end terminals 101 and 102 perform control so that in estimating that there is a communication breakdown due to a problem on the route #1 of the communication network 51, the end terminals 101 and 102 switch the communication from the path #1 to the path #2 to maintain the communication quality between the end terminals 101 and 102.

Here, the end terminals 101 and 102 perform management only in terms of path, but do not perform the management in terms of route assigned with the path. The end terminals can estimate occurrence of congestion on the path by measuring a packet transmission and reception between the end terminals 101 and 102. On the other hand, the end terminals 101 and 102 cannot understand detailed information about the condition in the communication network, such as in which apparatus on the route assigned with the path the congestion occurs. Moreover, the end terminals 101 and 102 cannot estimate a state of a route assigned with no path.

Moreover, a state of the communication network between the end terminals varies dynamically. When the state of the communication network varies, the communication quality may not be possibly maintained in the route assigned with the path.

With reference to FIG. 3, a problem that the communication quality cannot be maintained due to variation in the state of the communication network will be described. FIG. 3 illustrates a communication network including a path and a route used when communication is performed among a plurality of end terminals (the end terminal 101, the end terminal 102, an end terminal 201, and an end terminal 202). The end terminal 101 and the end terminal 102 are utilized by a first user, and the end terminal 201 and the end terminal 202 are utilized by a second user. Communication networks 51 and 52 between the end terminals 101 and 102 include an edge apparatus and a relay apparatus. The edge apparatus serves to house an end terminal in the communication network, and the relay apparatus serves to transfer traffic between edge apparatuses. In the communication network 51, there is a route 1001 between an edge apparatus 11 and an edge apparatus 12. In the communication network 52, there are a route 2001 and a route 2002 between an edge apparatus 21 and an edge apparatus 22, and there is a route 2003 between an edge apparatus 17 and an edge apparatus 18. In an initial state, a path 10001 between the end terminal 101 and the end terminal 102 is assigned to the route 1001, a path 10002 therebetween is assigned to the route 2002, and a path 20001 between the end terminal 201 and the end terminal 202 is assigned to the route 2003.

Here, it is assumed that traffic increases in the path 20001 between the end terminal 201 and the end terminal 202. Congestion may possibly occur in the route 2003 assigned with the path 20001. If congestion occurs between the edge apparatus 17 and the edge apparatus 18 on the route 2003, the communication quality of the path 10002 on the route 2002 that passes through the edge apparatus 17 and the edge apparatus 18 is deteriorated.

In an operation of an end terminal in a normal SD-WAN, the end terminal 101 and the end terminal 102 detect deterioration of the communication quality of the path 10002 from a measurement result from a packet transmission and reception between the end terminal 101 and the end terminal 102 on the path 10002, and switch all or some of the communication from the path 10002 to the path 10001 to maintain the communication quality between the end terminals. However, if the congestion of the route 2002 is stabled to prevent a recovery, and the congestion or failure occurs also on the route 1001 assigned with the path 10001, there is a problem that management at the end terminal alone is not sufficient to solve the issue. Thus, a countermeasure for changing route assignment of a path on a communication network side in accordance with variation in state of the communication network may be considered.

With reference to FIG. 4, a modification in which a state of the communication network is varied will be described. The path 10002 is assigned to the route 2002, if congestion on the route 2002 is stabled to prevent a recovery as described above and there is also congestion on the route 1001 assigned with the path 10001, it may be preferable to reassign the path 10002 to the route 2001 rather than to the route 2002.

On the other hand, in terms of a band management in the communication network, it is not preferable to frequently change a setting. This is because each time route assignment is changed, the communication quality of a path already assigned to a route being a change destination is affected, which leads to a problem that the communication quality is not stable. Thus, it is desirable to determine whether to change a setting so that no frequent change occurs in controlling change of route assignment of a path in accordance with variation in state of the communication network.

CITATION LIST

Non Patent Literature

NPL 1 https://www.onug.net/app/uploads/2015/05/ONUG-SD-WAN-WG-Whitepaper_Final1.pdf

SUMMARY OF THE INVENTION

Technical Problem

Thus, it is an object of the present disclosure to enable efficient route assignment that guarantees a communication quality for each path between end terminals even if a state of a communication network varies.

Means for Solving the Problem

The present disclosure includes a plurality of edge apparatuses that each house end terminals, a plurality of relay apparatuses that transfer data between the edge apparatuses, and a network controller, where the network controller is in a network for performing data communication between end terminals that satisfies a desired communication quality by using a plurality of paths. The network controller collects log information of a communication state for each path; determines, based on the log information, whether there is a path with a deteriorated communication quality; if there is a deteriorated path, determines, based on the log information, whether a communication quality between end terminals utilizing the deteriorated path can be guaranteed by using all paths available to the end terminals; if the communication quality between the end terminals cannot be guaranteed, calculates a new route that can satisfy a desired communication quality without affecting a communication quality of another end terminal, where the new route serves as a change destination of the deteriorated path; and transmits information about the calculated route to each apparatus that performs a transfer process of the deteriorated path.

Specifically, the network controller apparatus according to the present disclosure is a network controller apparatus connected to a communication network that performs data communication between end terminals by using a plurality of paths.

The network controller apparatus includes a network state database that stores log information about a communication state for each of the plurality of paths collected from the communication network, an update determination unit that determines whether there is a path with a deteriorated communication quality on the basis of the log information, and if there is a deteriorated path, determines whether a communication quality between end terminals utilizing the deteriorated path is guaranteed by using an additional path not utilized by another end terminal, from among other paths available to the end terminals utilizing the deteriorated path, and an apparatus communication unit that sets, as a new path of the end terminals utilizing the deteriorated path, the additional path to the communication network if the update determination unit determines that the communication quality between the end terminals utilizing the deteriorated path is guaranteed.

In the network controller apparatus according to the present disclosure, the update determination unit may calculate a total value of a traffic flow amount of the additional path, and if a traffic flow amount between the end terminals utilizing the deteriorated path is smaller than the total value, determine that the communication quality between the end terminals utilizing the deteriorated path is guaranteed.

The network controller apparatus according to the present disclosure may further include a route calculation unit that calculates a new path of the end terminals utilizing the deteriorated path by using a route different from a route assigned with the deteriorated path if the update determination unit determines that the communication quality between the end terminals utilizing the deteriorated path is not guaranteed, where the apparatus communication unit may set, as a new path of the end terminals utilizing the deteriorated path, the new path calculated by the route calculation unit to the communication network.

The route calculation unit may calculate a new path of the end terminals utilizing the deteriorated path by using a route being less likely to affect a communication quality of another end terminal, from among routes different from the route assigned with the deteriorated path.

A network control system according to the present disclosure includes the network controller apparatus according to the present disclosure, and a communication network connected to the network controller apparatus. The communication network includes a plurality of edge apparatuses that each house the end terminals, and a plurality of relay apparatuses that transfer data between the plurality of edge apparatuses.

The network controller apparatus notifies edge apparatuses housing the end terminals utilizing the deteriorated path of switching to the new path, and the plurality of edge apparatuses switch to the new path according to the notification from the network controller apparatus.

A method of controlling a communication network according to the present disclosure is a method being executed by a network controller connected to a communication network where data communication between end terminals is performed by using a plurality of paths. The method includes: collecting, by the network controller, log information of a communication state for each of the plurality of paths; determining, by the network controller, whether there is a path with a deteriorated communication quality based on the log information; if there is a deteriorated path, determining, by the network controller, whether a communication quality between end terminals utilizing the deteriorated path is guaranteed by using an additional path not utilized by another end terminal, from among other paths available to the end terminals utilizing the deteriorated path; and setting, by the network controller, as a new path of the end terminals utilizing the deteriorated path, the additional path to the communication network if it is determined that the communication quality between the end terminals utilizing the deteriorated path is guaranteed.

In a method of controlling a communication network according to the present disclosure, the network controller may calculate a new path of the end terminals utilizing the deteriorated path by using a route different from a route assigned with the deteriorated path if it is determined that the communication quality between the end terminals utilizing the deteriorated path is not guaranteed, and set, as a new path of the end terminals utilizing the deteriorated path, the new path calculated by the route calculation unit to the communication network.

A program according to the present disclosure is a program causing a computer to operate as a plurality of functional units included in the network controller apparatus according to the present disclosure. The program according to the present disclosure causes the computer to execute the procedures provided in the method of controlling a communication network according to the present disclosure. The program according to the present disclosure may be recorded on a recording medium or provided via a network.

Note that each of the above-described disclosures may be combined with each other to the extent possible.

Effects of the Invention

According to the present disclosure, it is possible to enable efficient route assignment that guarantees a communication quality for each path between end terminals even if a state of a network varies.

BRIEF DESCRIPTION OF DRAWINGS

FIG. 10 is a table showing an example of a network state DB during a normal time.

FIG. 13 is a table showing an example of the network state DB during variation.

FIG. 15 is a table showing an example of a path and route DB.

DESCRIPTION OF EMBODIMENTS

Figure 1:
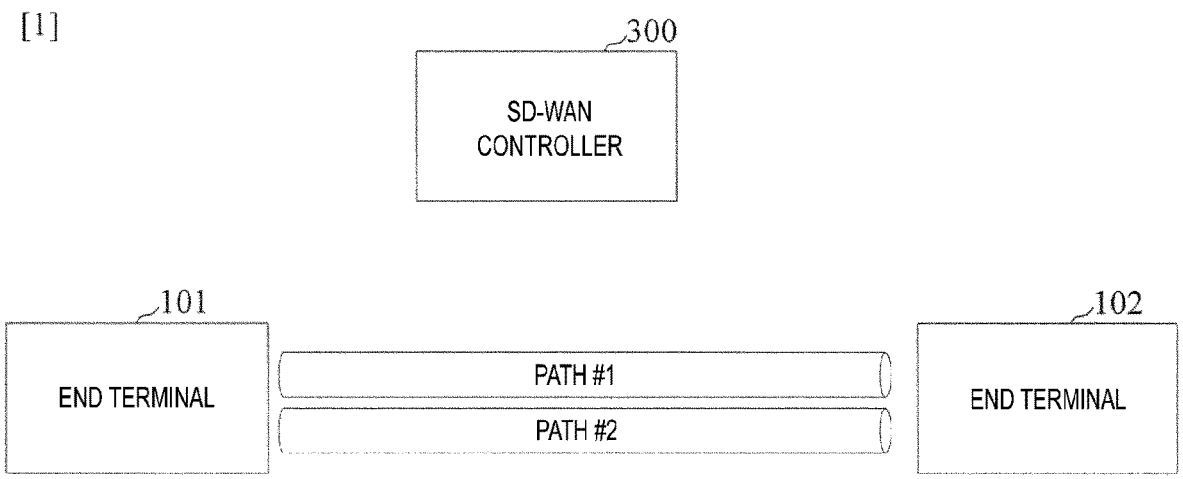
FIG. 1 is a diagram illustrating a path management between end terminals in SD-WAN.
Figure 2:
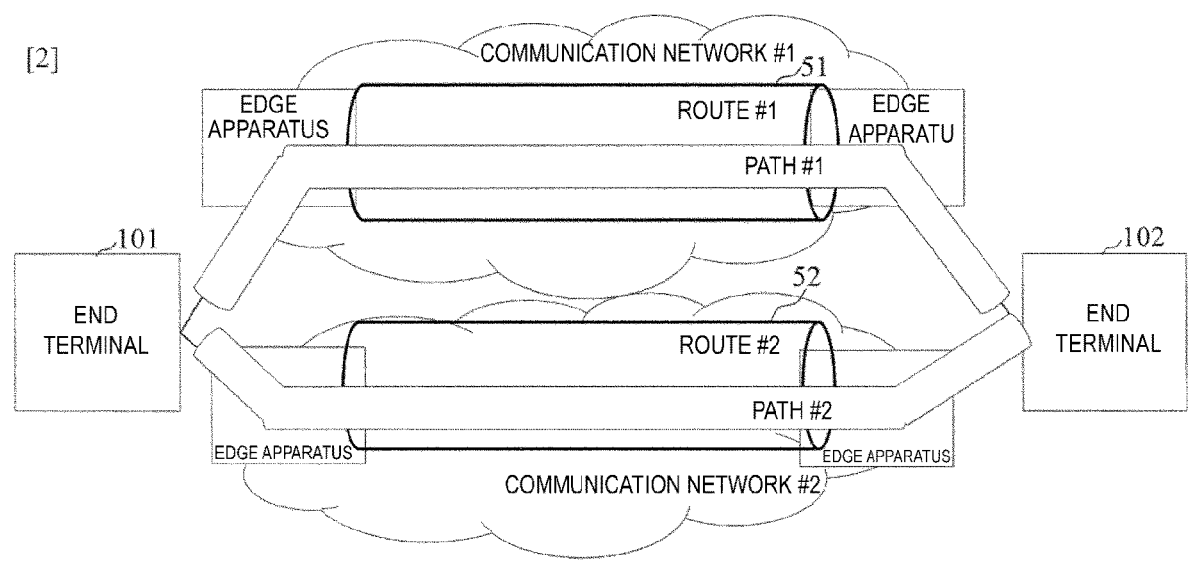
FIG. 2 is a diagram illustrating a route between the end terminals in the SD-WAN.

An embodiment of the present disclosure will be described in detail with reference to the drawings. Note that the present disclosure is not limited to the embodiment described below. The embodiment is merely an example, and the present disclosure can be implemented with various modifications and improvements made to the invention based on knowledge of a person skilled in the art. In the present specification and the drawings, constituent elements with the same reference signs indicate the same constituent elements.

SUMMARY OF THE DISCLOSURE

To propose a means for ensuring a communication quality between end terminals by understanding variation in a state of a network and changing route assignment for each path between the end terminals to the minimum. The above-described means includes a network control system and a network controller.

Network Control System

A network control system according to the present disclosure controls a network described below.

A network to be controlled includes an edge apparatus that houses an end terminal, where the edge apparatus includes a plurality of the edge apparatuses, a relay apparatus that transfers data between such edge apparatuses, and a network controller that manages a network, to perform data communication between end terminals that satisfy a communication quality desired by a user by using a plurality of paths.

The network controller of the present system operates according to the following procedures. The network controller collects a log of a communication state for each pass from the network, determines, on the basis of the collected information, whether there is a path with a deteriorated communication quality, and if there is a path with a deteriorated communication quality, determines, on the basis of the collected information, whether the communication quality between the end terminals can be guaranteed by using all paths managed by a user using the deteriorated path to prevent an unnecessary change of route assignment.

If the communication quality is not guaranteed, the network controller calculates a new route to be assigned so that a communication quality of another user in the network is not affected and a desire of the user can be satisfied.

On the other hand, if the communication quality is guaranteed, the network controller transmits a calculation result of the new route to an apparatus that manages a transfer process of the path without changing the route assignment of the deteriorated path.

Network Controller

A network controller apparatus according to the present disclosure is connected to a network, and includes a log reception unit, a network state DB, an update determination unit, a route calculation unit, a path and route information DB, and an apparatus transmission unit.

The network includes an edge apparatus that houses an end terminal, where the edge apparatus includes a plurality of the edge apparatuses, a relay apparatus that transfers data between such edge apparatuses, where the relay apparatus includes a plurality of the relay apparatuses, and a network controller that manages a network, to perform data communication between end terminals that satisfy a communication quality desired by a user by using a plurality of paths. The log reception unit includes a function of receiving a log in a communication state from the relay apparatus in the network.

The network state DB stores time-series data of a communication state for each path in each link (a link between the relay apparatuses and a link between the edge apparatus and the relay apparatus) on the basis of the log information received in the log reception unit.

The update determination unit determines whether there is a path with a deteriorated communication quality on the basis of information of the network state DB and the path and route information DB storing information about a route assigned with each path, and in a case where there is a deteriorated path, determines that an update is needed if the communication quality between the end terminals cannot be guaranteed by using all the paths managed by a user using the deteriorated path to prevent an unnecessary change of route assignment.

The route calculation unit calculates a new path for the path determined to be updated by the update determination unit so that a communication quality of another user in the network is not affected and a desire of the user can be satisfied.

In the path and route information DB, information about a route assigned with the path is stored on the basis of the information about the route calculated in the route calculation unit.

The apparatus transmission unit transmits the information about the route calculated in the route calculation unit, to an apparatus that manages the transfer process of the path.

Figure 5:
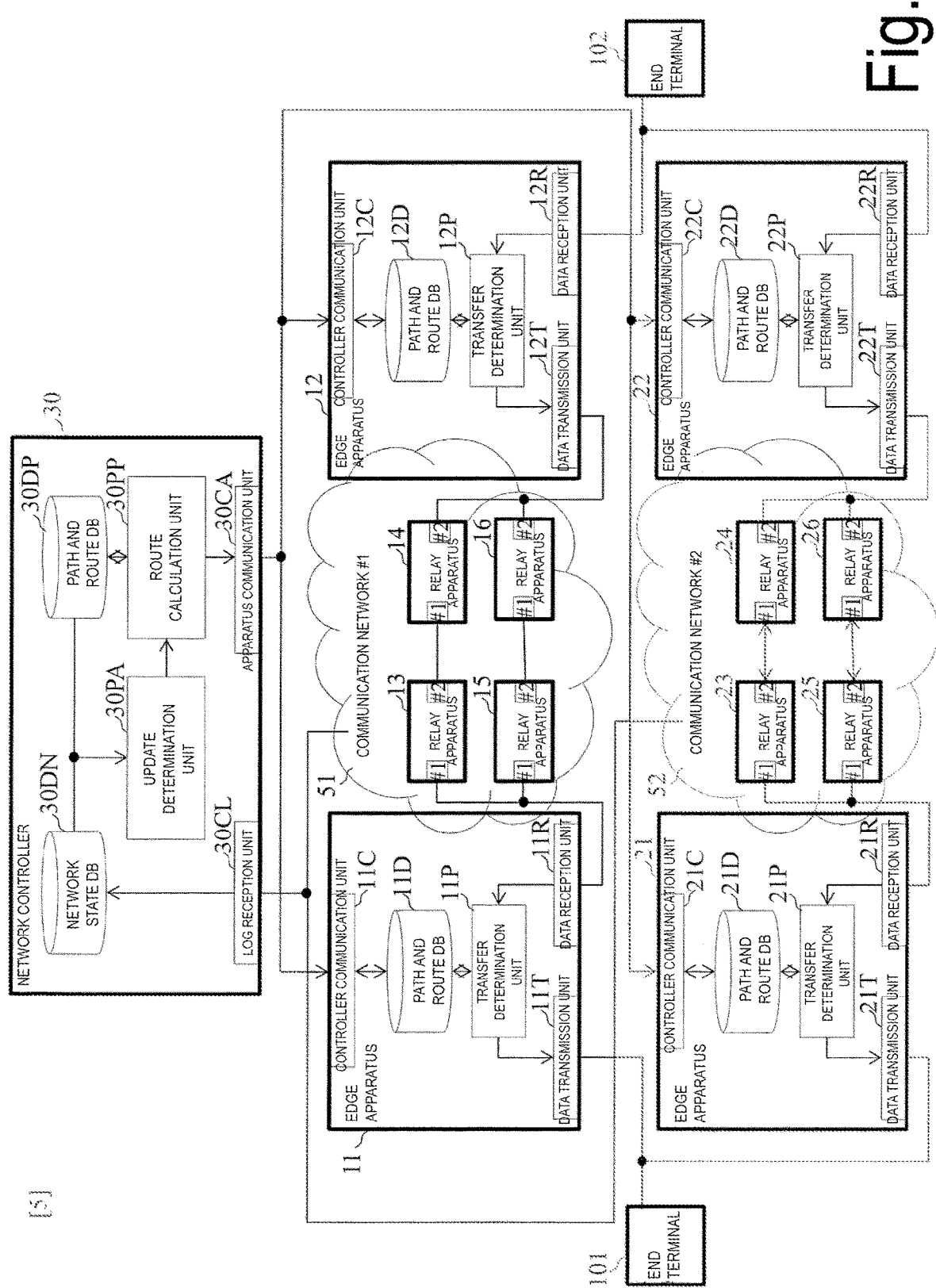
FIG. 5 is a diagram illustrating a network control system according to the present embodiment.

FIG. 5 illustrates an example of a system configuration according to the present embodiment. The communication network according to the present disclosure includes a network controller 30, edge apparatuses 11, 12, 21, and 22, and relay apparatuses 13, 14, 15, 16, 23, 24, 25, and 26. In the communication network according to the present embodiment, the end terminals 101 and 102 are connected through a plurality of networks 51 and 52. The end terminal 101 is connected to the network 51 via the edge apparatus 11, and is connected to the network 52 via the edge apparatus 21. The end terminal 102 is connected to the network 51 via the edge apparatus 12, and is connected to the network 52 via the edge apparatus 22. FIG. 5 illustrates an example of a communication network in which the network 51 is connected through the relay apparatuses 13, 14, 15, and 16 and the network 52 is connected through the relay apparatuses 23, 24, 25, and 26.

The network controller 30 can collect information not only about one network but also about the plurality of networks 51 and 52 for control. In the present embodiment, when the network controller 30 capable of understanding and controlling states of all of the different networks 51 and 52 is provided, it is possible to perform a coordinated control between the networks 51 and 52. Due to the coordinated control between the networks 51 and 52, it is possible to maintain the communication quality between the end terminals 101 and 102 while minimizing an effect on the user communication by the control.

The network controller 30 includes a network state data base (DB) 30DN, a path and route DB 30DP, an update determination unit 30PA, a route calculation unit 30PP, a log reception unit 30CL, and an apparatus communication unit 30CA.

Figure 6:
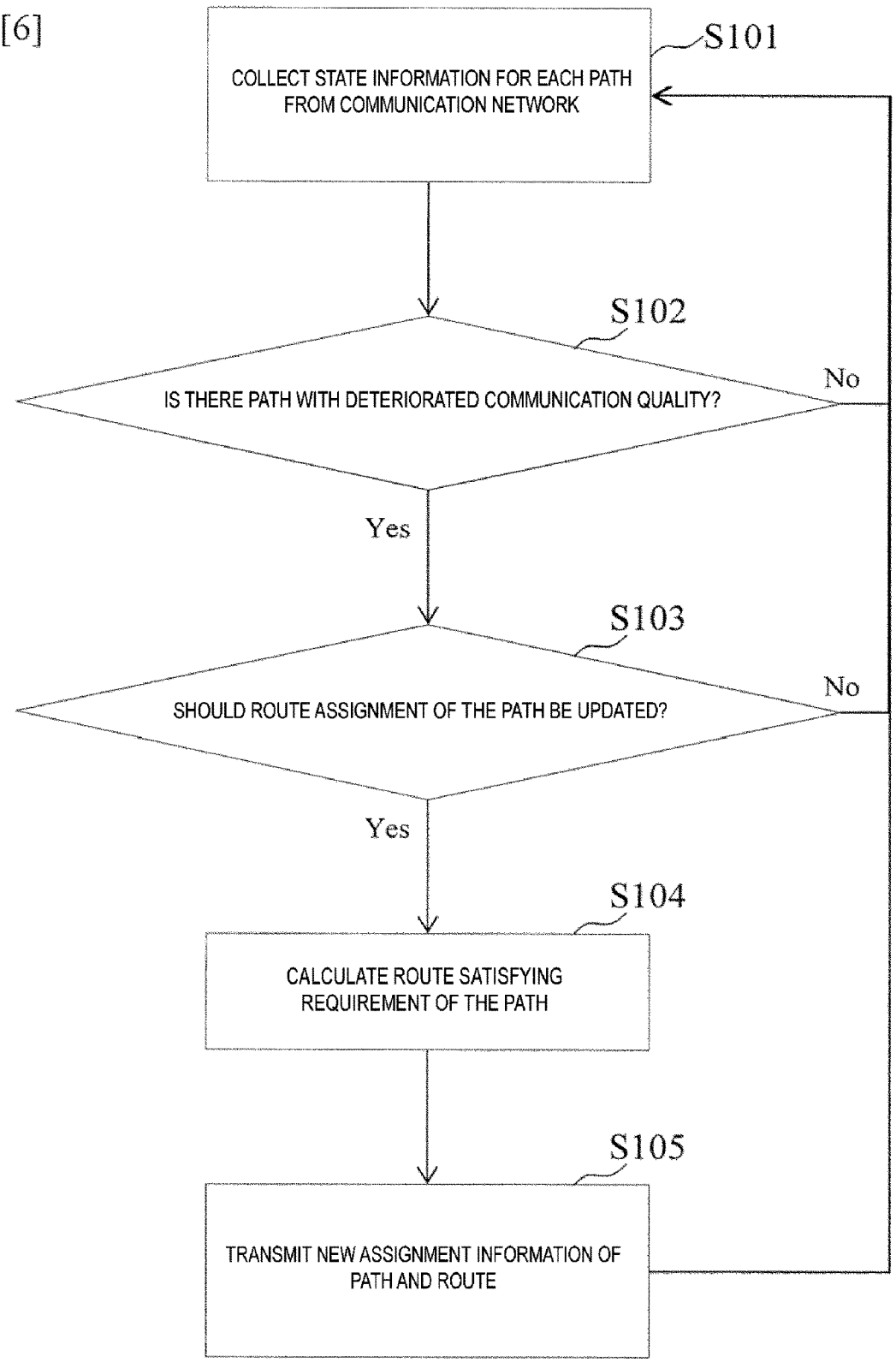
FIG. 6 is a diagram illustrating a method of controlling a communication network executed by a network controller.

FIG. 6 is a flowchart illustrating an example of an operation of the network controller 30. The network controller 30 executes procedures S101 to S105.

The log reception unit 30CL of the network controller 30 executes procedure S101. In procedure S101, the log reception unit 30CL collects a log of a communication state for each path from the networks 51 and 52. The network state DB 30DN stores the log of the communication state for each path.

Next, the update determination unit 30PA of the network controller 30 executes procedure S102 and procedure S103. In procedure S102, the update determination unit 30PA determines whether the communication quality of each path is deteriorated from a communication state for each path acquired from the network state DB 30DN. If there is a path with the deteriorated communication quality (Yes in S102), the update determination unit 30PA determines whether to update route assignment of the path (S103). If No either in the procedure S102 or the procedure S103, the procedure S101 is repeated. If Yes in the procedure S103, the process proceeds to procedure S104.

Next, the route calculation unit 30PP of the network controller 30 executes procedure S104. In procedure S104, the route calculation unit 30PP calculates a new route for the path. Next, the apparatus communication unit 30CA of the network controller 30 executes procedure S105. In procedure S105, the apparatus communication unit 30CA transmits the route information to each of the edge apparatuses 11, 12, 21, and 22 through which the path passes through.

Effect of the Present Disclosure

According to the present disclosure, it is possible to understand variation in state of the communication networks 51 and 52 and efficiently change the route assignment for each path between the end terminals 101 and 102. Thus, in the present disclosure, even if the state of the network varies, it is possible to provide a network control system including a function of efficiently assigning a route that guarantees the communication quality between the end terminals 101 and 102 and also provide the network controller 30 therefor.

The network control system and the network controller 30 according to the embodiment relating to the present disclosure will be described with reference to the drawings. Note that the network control system and the network controller 30 according to the present disclosure can be applied to an information communication industry.

Example of Normal Operation

Figure 7:
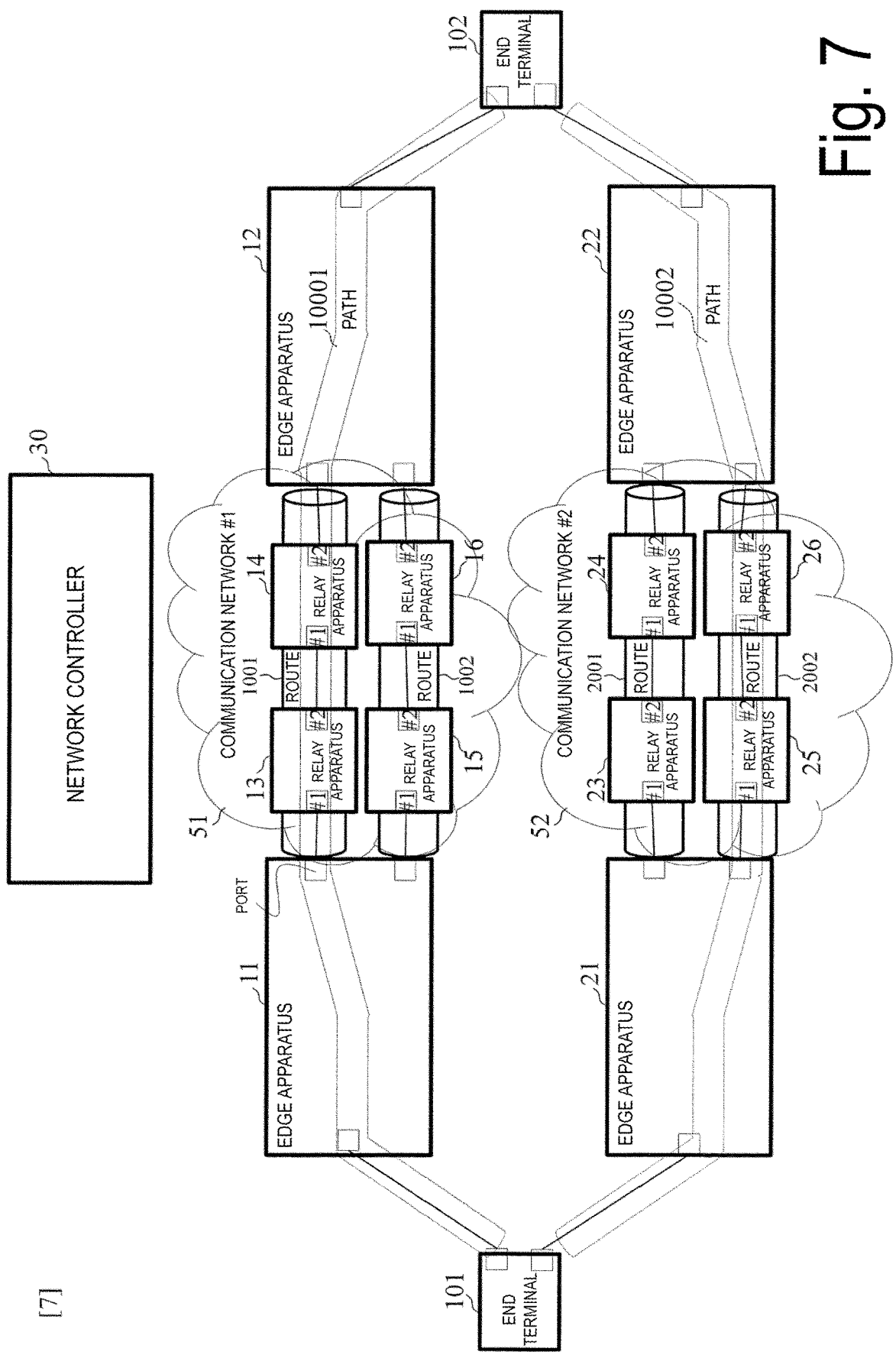
FIG. 7 is a diagram illustrating an example of a normal state.

FIG. 7 illustrates a diagram representing an example of a normal operation in the network using the network control system and the network controller according to the present embodiment. An embodiment during the normal operation is described below with reference to FIG. 5 and FIG. 7. Note that the network controller 30 and each of the edge apparatuses 11, 12, 21, and 22 are connected, but connection lines are omitted in FIG. 7.

Example of Control of End Terminal

First, an example of a control in the end terminal 101 and the end terminal 102 will be described. The end terminal 101 and the end terminal 102 manage the path 10001 and the path 10002. In transmitting and receiving a packet in each of the path 10001 and the path 10002, each end terminal understands the communication quality. Examples of the communication quality of the path include a latency time, a jitter value, and the number of packet losses. On the basis of the communication quality of each path, each end terminal determines a type and a flow amount of traffic transferred in each of the paths 10001 and 10002. For example, if the latency time of a transmission and reception result of a packet in the path 10001 is very short allowing for real-time communication, the end terminal 101 and the end terminal 102 transfer a packet of a real-time communication protocol (for example, real-time transport protocol (rtp)) in the path 10002, and perform a control so that a packet of another protocol is transferred in the path 10001. Note that it is assumed that any apparatus satisfying the technical requirements of the SD-WAN is employed for the end terminal.

Example of Control of Edge Apparatus

Next, an example of a control in the edge apparatus 11 will be described. The edge apparatus 11 previously receives, from the network controller 30, route information indicating that the path 10001 is assigned to the route 1001, and stores the route information in the path and route DB 11D. If a user packet is received from the end terminal 101, the edge apparatus 11 acquires the information indicating that "the path 10001 is assigned to the route 1001" from the path and route DB 11D, and transfers the user packet from an output port (port connected to the relay apparatus 13) corresponding to the route 1001. Note that a similar transfer control is also performed in the other edge apparatus 12, edge apparatus 21, and edge apparatus 22.

An example of the transfer control of the edge apparatus is described below. For example, if the edge apparatus 11 is an OpenFlow switch, the edge apparatus 11 adds a flow entry defining a transfer destination on the basis of header information of the user packet. For example, if a user packet is a packet from the end terminal 101, that is, a packet of the path 10001, a flow entry specifying a transfer to a port connected to the relay apparatus 13 is added. Note that in an example, as long as any edge apparatus can determine any output port for each path, the transfer control of the edge apparatus can employ any implementation method.

Example of Control of Relay Apparatus

Next, an example of a control in the relay apparatus will be described. The relay apparatus 13 receives a user packet from the edge apparatus 11, and transfers the received user packet to the relay apparatus 14 on the basis of header information of the user packet. Note that a similar transfer control is performed in the other relay apparatuses 14 to 16 and relay apparatuses 23 to 26.

An example of the transfer control of the relay apparatus is described below. For example, in performing IP routing, the relay apparatus 13 determines that a next hop is the relay apparatus 14 on the basis of a destination IP address (address of the end terminal 102). If, for example, the relay apparatus 13 is an OpenFlow switch, the relay apparatus 13 is added with a flow entry specifying a transfer to a port connected to the relay apparatus 14 if the destination IP address is the address of the end terminal 102. For example, if the edge apparatus 11 and the edge apparatus 12 capsule a user packet by using Multi Protocol Label Switching (MPLS) or Virtual eXtensible Local Area Network (VxLAN), the relay apparatus 13 determines that the relay apparatus 14 is the next hop because the destination IP address of a capsuling header is the edge apparatus 12. Note that in an example, as long as any relay apparatus can transfer a packet along a route set in the edge apparatus, the transfer control of the edge apparatus may employ any implementation means. Note that it is assumed that an apparatus equipped with an existing routing function is employed for the relay apparatus.

Example of Control of Network Controller

Next, an example of a control in the network controller 30 will be described with reference to FIG. 5.

Figure 8:
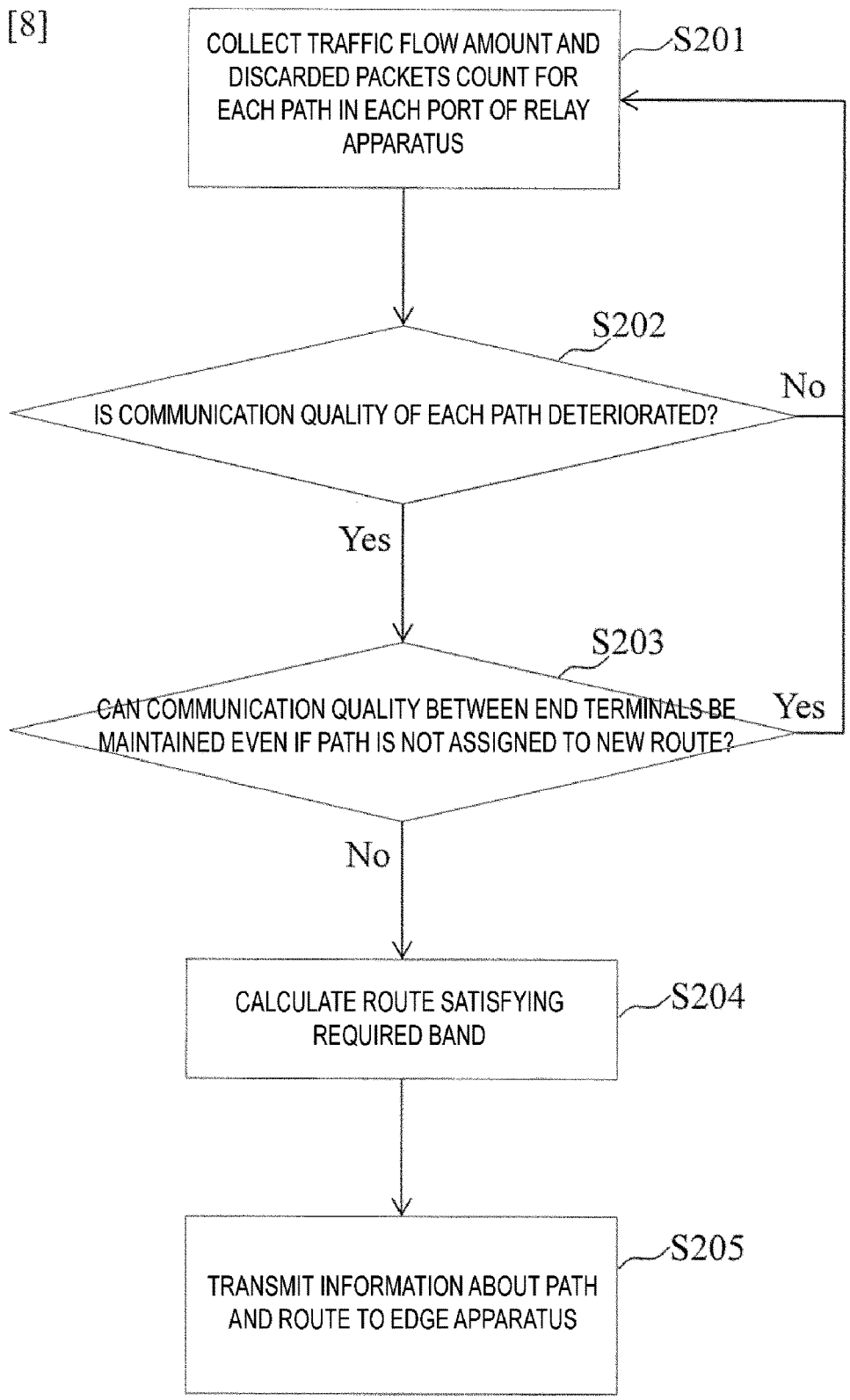
FIG. 8 is a diagram illustrating an embodiment of the method of controlling a communication network executed by the network controller.
Figure 9:
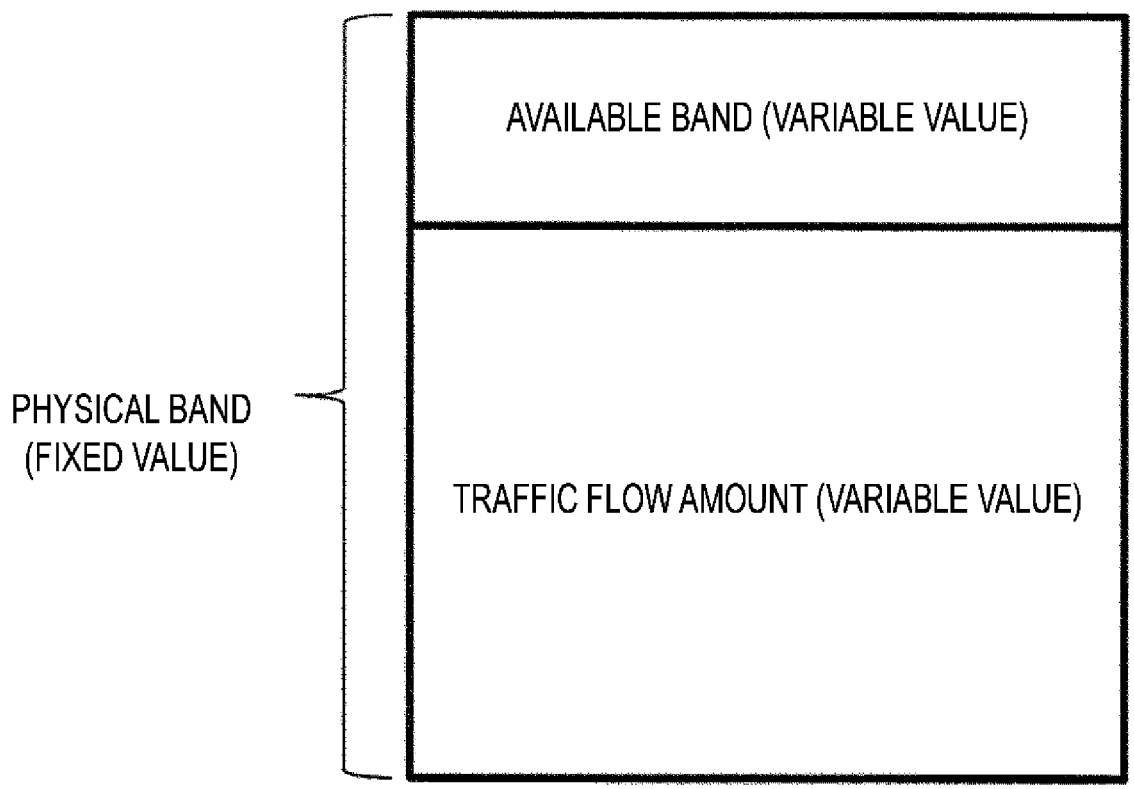
FIG. 9 is an explanatory diagram of an available band.

FIG. 8 illustrates an example of a procedure in the network controller 30. The network controller 30 performs procedures S201 to S205 described below. Note that in the following description, a physical band represents a capacity of each port (in this case, an amount of traffic that can be transferred when no packet is discarded), and is a fixed value. The traffic flow amount refers to an amount of traffic to be transferred at each port measured in procedure S201 of FIG. 8, and is a variable value. In addition, an available band can be evaluated by a physical band—traffic flow amount, represents how much more traffic can be transferred at each port, and is a variation value. FIG. 9 illustrates a relationship between the physical band, the available band, and the traffic flow amount.

Specific Example of Procedure S201 (Log Collection)

Procedure S201 is a procedure in which the log reception unit 30CL of the network controller 30 collects log data from all the ports of each relay apparatus of all the communication networks 51 and 52. In this example, the network controller 30 collects and accumulates, as the log data, the traffic flow amount and a discarded packets count for each link and path. An example of collection is shown in FIG. 10. FIG. 10 is a part of a whole table in which the log data of the entire communication network and the log data in a chronological order are stored. Note that as long as the same information can be stored, any storage format other than the format in the collection example may be employed. The collected log data is stored in the network state DB 30DN.

Specific Example of Procedure S202 (Determination of Path State)

Procedure S202 is a procedure for the update determination unit 30PA of the network controller 30 to determine that the communication quality of the path passing through a link between any relay apparatuses is deteriorated on the basis of the log data collected in the network state DB 30DN.

First Specific Example: Example Using Discarded Packets Count

The update determination unit 30PA determines, on the basis of a discarded packets count for each path collected as the log data, that the communication quality of the path is deteriorated when an upper limit value of a previously set discarded packets count for each path is exceeded. It is assumed that the log is collected as in FIG. 10 and the upper limit value of the discarded packets count of the path 10001 is set to 1000. The discarded packets count at each port of the relay apparatus 13 and the relay apparatus 14 of the path 10001 is 50, and thus, the update determination unit 30PA determines that the upper limit value is not exceeded and the communication quality of the path 10001 is not deteriorated. At this time, the control of the network controller 30 proceeds to procedure S201.

Second Specific Example: Example Using Traffic Flow Amount

The update determination unit 30PA determines that the communication quality of the path is deteriorated, on the basis of a flow amount, as the log data, for each path collected in the network state DB 30DN. For example, if a total amount of the traffic flow amount at each port exceeds the physical band of the port, the update determination unit 30PA determines that the communication quality of the path is deteriorated because the packet may be possibly discarded.

It is assumed that the log is collected as in FIG. 10 and the physical band of each port of the relay apparatus 13 and the relay apparatus 14 is set to 10 Gbps. It is also assumed that the relay apparatus 13 and the relay apparatus 14 are connected through a relay apparatus 13/port #2 and a relay apparatus 14/port #1. It is further assumed that a total value of the traffic flow amounts of all the paths passing through the relay apparatus 13/port #2 and the relay apparatus 14/port #1 in FIG. 10 is 3 Gbps. The update determination unit 30PA determines that the communication quality of the path 10001 is not deteriorated because the traffic flow amount does not exceed the physical band. At this time, the control of the network controller 30 proceeds to procedure S201.

Note that if it is possible to determine that the communication quality of each path is deteriorated, a controller of the network controller 30 can set any reference in which the log data is used, to the update determination unit 30PA. Note that in FIG. 7, there are two communication networks, that is, the communication network 51 and the communication network 52, between the end terminal 101 and the end terminal 102, but one or more communication networks may be provided therebetween. Note that in FIG. 7, there are two paths, that is, the path 10001 and the path 10002, between the end terminal 101 and the end terminal 102, but one or more paths may be provided therebetween.

Figure 3:
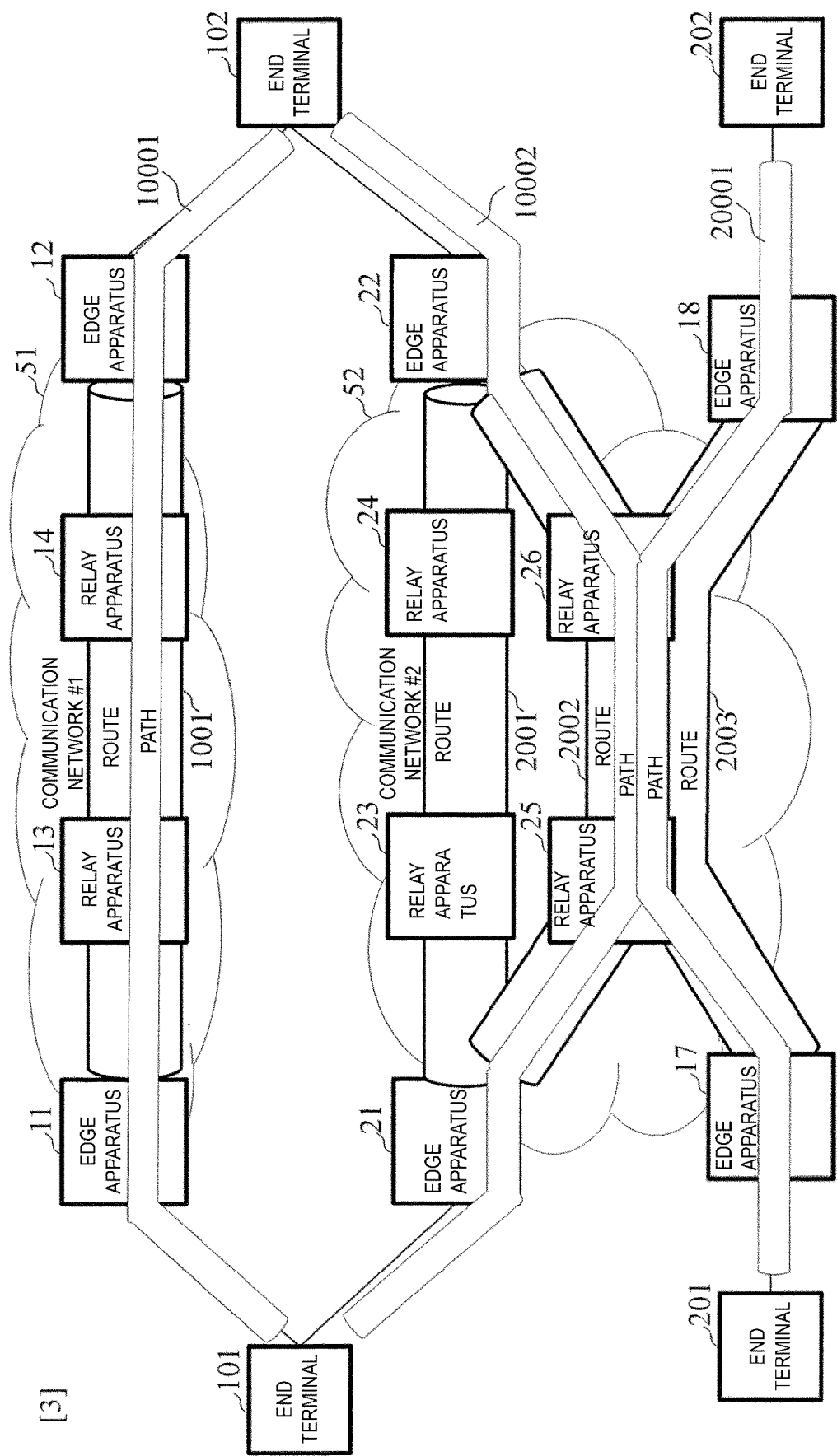
FIG. 3 is a diagram illustrating a path between the end terminals in the SD-WAN being assigned to each route.
Figure 4:
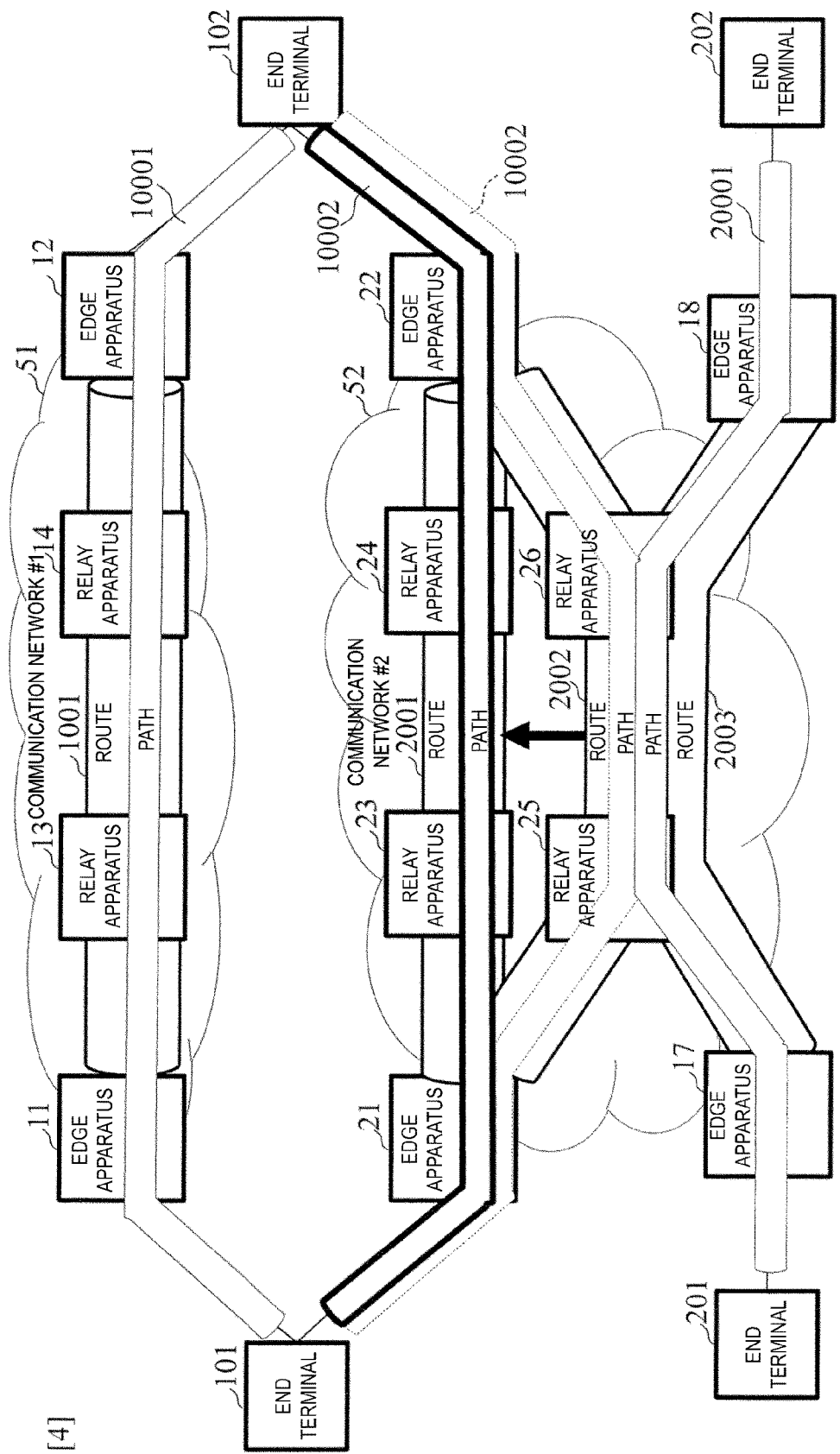
FIG. 4 is a diagram illustrating a change when a state of a communication network varies.

Note that in FIG. 7, there is one user utilizing the end terminal 101 and the end terminal 102, but a plurality of users may utilize the end terminal 101 and the end terminal 102, and the plurality of end terminals can be housed. Thus, as illustrated in FIG. 3, each communication network (the communication network 51 and the communication network 52) is used also by different users, and thus, the state of the communication network is dynamically varied according not only to a use situation by one user but also to a use situation by a plurality of users.

Note that in FIG. 7, there are two routes, that is, the route 1001 and the route 1002, between the edge apparatus 11 and the edge apparatus 12, but two or more routes may be set therebetween. The same applies to between the other edge apparatuses. Note that in FIG. 7, the route 1001 passes through two relay apparatuses, that is, the relay apparatus 13 and the relay apparatus 14, but may pass through one or more relay apparatuses. The same applies to the other routes. Note that in FIG. 7, the network controller 30 collects a communication state log for each path from each edge apparatus and each port of the relay apparatus within the communication network 51 and the communication network 52, but a network controller layered configuration in which the network controller is provided separately for each communication network may be employed in view of scalability.

Figure 11:
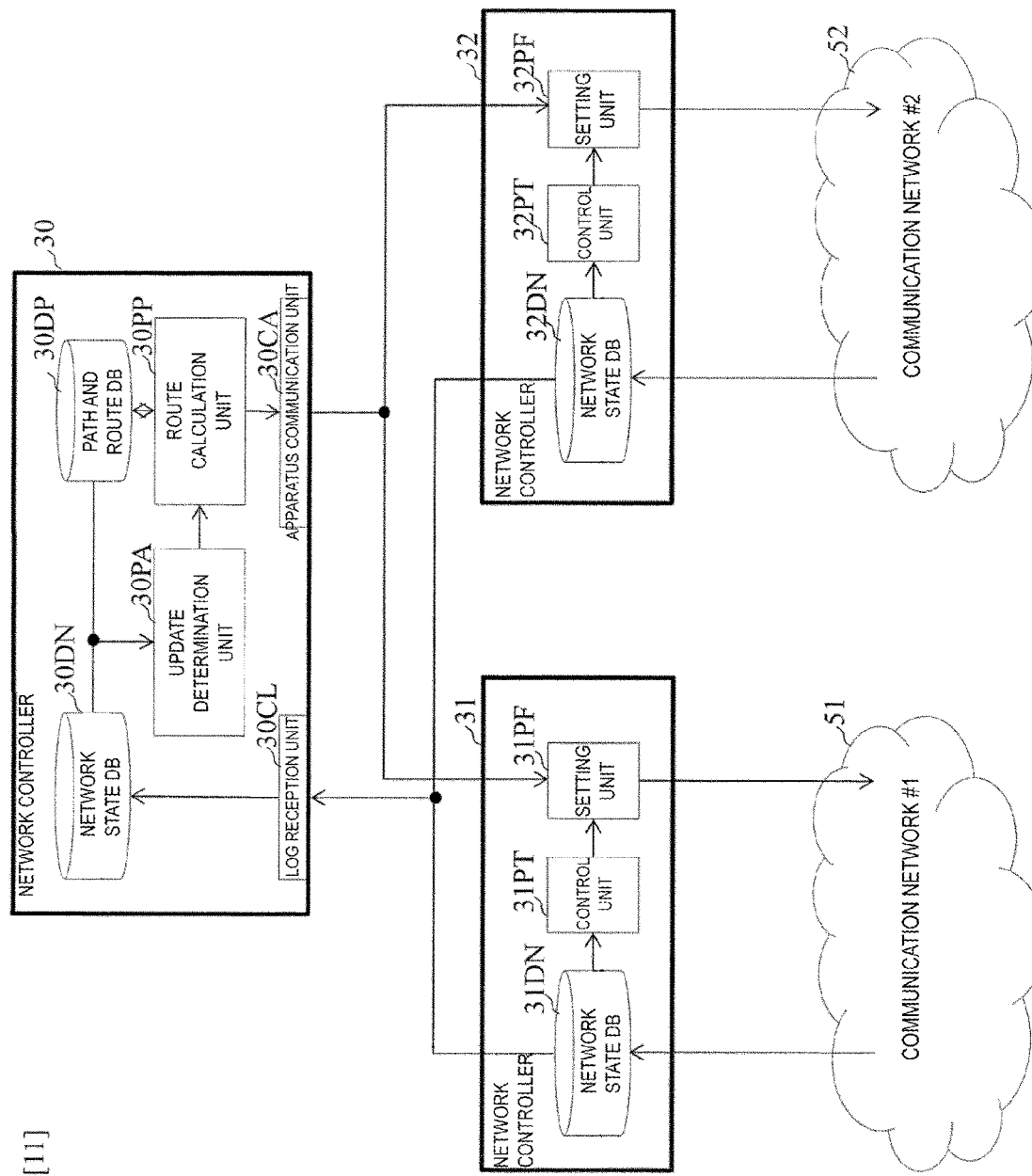
FIG. 11 is a diagram illustrating an example of a second configuration of the network controller.

FIG. 11 illustrates a second configuration example of the network controller 30 according to the present embodiment. The communication network according to the present disclosure includes a network controller 31 that controls a route of the communication network 51, a network controller 32 that controls a route of the network 52, and the network controller 30 that controls the network controllers 31 and 32.

The network controller 31 includes a network state DB 31DN, a control unit 31PT, and a setting unit 31PF. The network controller 31 collects a network state log from the communication network 51 and stores the network state log in the network state DB 31DN. The control unit 31PT uses the network state log information collected in the network state DB 30DN to determine a control content for a route within the network 51 assigned with each path. The setting unit 31PF sets the control content to the network 51.

The network controller 32 includes a network state DB 32DN, a control unit 32PT, and a setting unit 32PF. The network controller 32 collects a network state log from the communication network 52 and stores the network state log in the network state DB 32DN. The control unit 32PT uses the network state log information collected in the network state DB 30DN to determine a control content for a route within the network 52 assigned with each path. The setting unit 32PF sets the control content to the network 52.

The log reception unit 30CL collects information from the network controller 31 and the network controller 32 and stores the collected information in the network state DB 30DN. Similarly to FIG. 5, in consideration of states of the communication network 51 and the communication network 52, an update content of information about route assignment for each path is calculated. The apparatus communication unit 30CA transmits the control content of the communication network 51 to the network controller 31 and transmits the control content of the communication network 52 to the network controller 32.

The setting unit 31PF sets the control content to the network 51 according to the control content received from the apparatus communication unit 30CA. The setting unit 32PF sets the control content to the network 52 according to the control content received from the apparatus communication unit 30CA.

The communication networks 51 and 52 are controlled individually by the network controller 31 and the network controller 32, and the control in consideration of the network state between the communication networks 51 and 52 as in the present disclosure may be performed by the network controller 30.

Example of Operation when Communication Network State Varies

Figure 12:
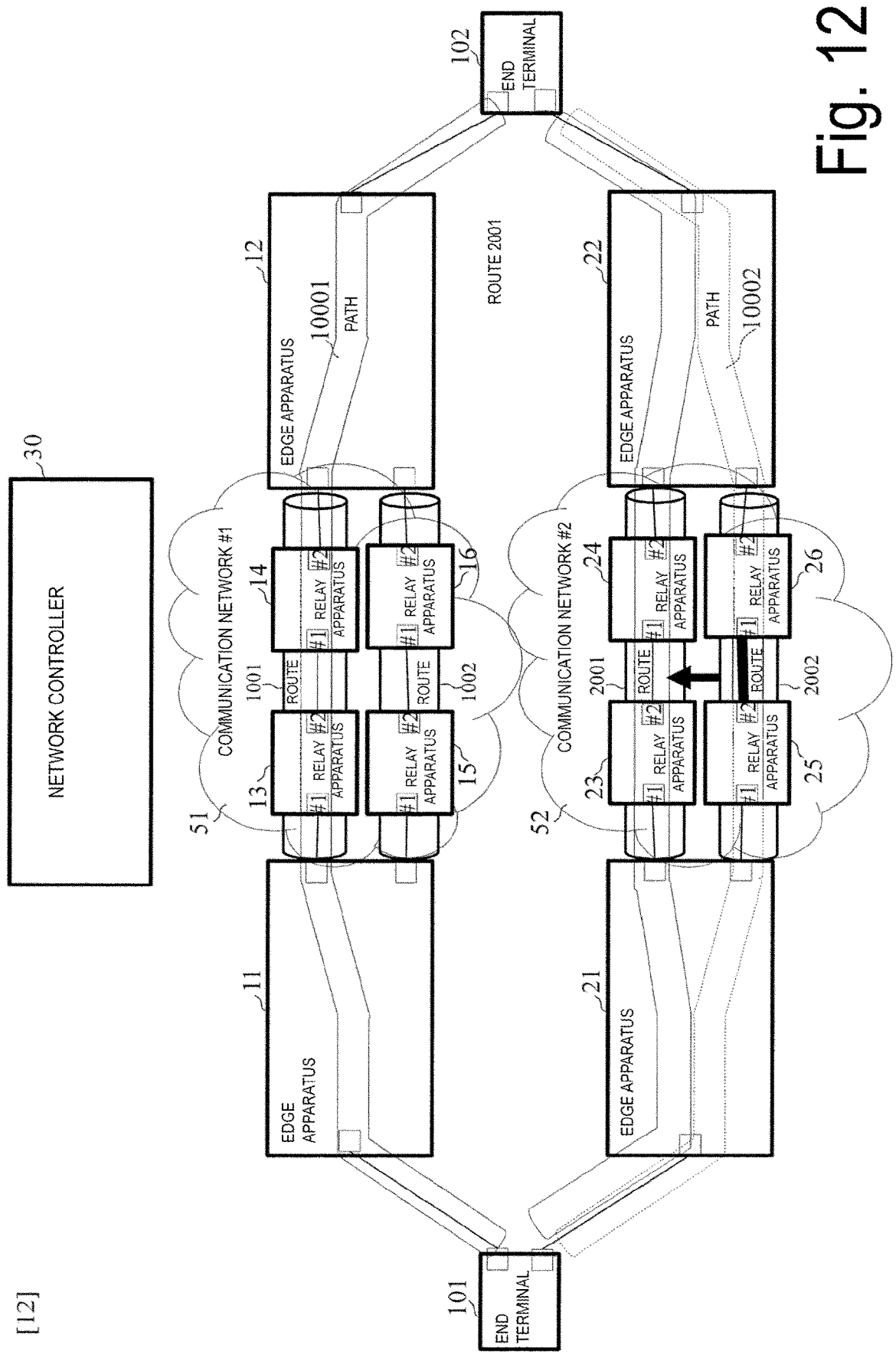
FIG. 12 is a diagram illustrating an example of a state in which variation occurs in the communication network.

FIG. 12 is an example of an operation during traffic variation in the communication network using the network control system and the network controller 30 according to the present embodiment. It is assumed that the traffic flow amount increases between the relay apparatus 25 and the relay apparatus 26, and congestion occurs. An embodiment during the traffic variation will be described below with reference to FIG. 12. Note that if the communication quality (a throughput, a latency time, and the like) between the end terminals 101 and 102 is affected, a change in any communication network state in addition to the traffic variation may be expected.

First, an example of a control in the network controller 30 will be described with reference to FIGS. 5 and 8. Note that a specific example of procedure S201 is in much the same way as during a normal time, and therefore, the description will be omitted here.

Specific Example of Procedure S202 (Determination of Path State)

Procedure S202 is a procedure for the update determination unit 30PA of the network controller 30 to determine that the communication quality of the path passing through a link between any relay apparatuses is deteriorated on the basis of the log data collected in the network state DB 30DN. Note that if it is possible to determine that the communication quality of each path is deteriorated, a controller of the network controller 30 can set any path state determination reference in which the log data is used. Further, for description, an example of collecting the log data during variation is shown in FIG. 13.

First Specific Example: Example Using Discarded Packets Count

The update determination unit 30PA determines, on the basis of a discarded packets count for each path collected, as the log data, in the network state DB 30DN, that the communication quality of the path is deteriorated when a threshold of a previously set discarded packets count for each path is exceeded. It is assumed that the log is collected as in FIG. 13 and the upper limit value of the discarded packets count of the path 10002 is set to 1000. The discarded packets count at each port of the relay apparatus 25 and the relay apparatus 26 of the path 10002 is 1500, and thus, the update determination unit 30PA determines that the upper limit value is exceeded and the communication quality of the path 10002 is deteriorated. At this time, the control of the network controller 30 proceeds to procedure S203.

Second Specific Example: Example Using Traffic Flow Amount

The update determination unit 30PA determines that the communication quality of the path is deteriorated, on the basis of a flow amount, as the log data, for each path collected in the network state DB 30DN. For example, if a total amount of the traffic flow amount at each port exceeds the physical band of the port, the update determination unit 30PA determines that the communication quality of the path is deteriorated because the packet may be possibly discarded.

It is assumed that the log is collected as in FIG. 13 and the physical band of each port of the relay apparatus 25 and the relay apparatus 26 is set to 10 Gbps. It is also assumed that the relay apparatus 25 and the relay apparatus 26 are connected through a relay apparatus 25/port #2 and a relay apparatus 26/port #1. It is further assumed that a total value of the traffic flow amounts of all the paths passing through the relay apparatus 25/port #2 and the relay apparatus 26/port #1 in FIG. 13 is 11 Gbps. The update determination unit 30PA determines that the communication quality of the path 10002 is deteriorated because the traffic flow amount exceeds the physical band. At this time, the control of the network controller 30 proceeds to procedure S203.

Specific Example of Procedure S203 (Determination of Route Update)

Procedure S203 is a procedure for determining, by the update determination unit 30PA of the network controller 30, on the basis of the log data collected in the network state DB 30DN, whether it is possible to maintain the communication quality between the end terminals without changing the route assignment of the path. Note that as long as it is possible to determine whether it is possible to maintain the communication quality between the end terminals 101 and 102 without changing the route assignment of the path, any method of the update determination may be employed.

First Specific Example: Example 1 Using Traffic Flow Amount

The update determination unit 30PA determines whether it is possible to add all the traffic of the path to be changed to another path. On the basis of the traffic flow amount, as the log data, for each link collected in the network state DB 30DN, the update determination unit 30PA calculates a total value of the traffic flow amount of all the paths of each link on a route assigned with a path that is a candidate addition target, and calculates an available band (=physical band—traffic flow amount) on the basis of the physical band of the link. Further, the update determination unit 30PA estimates a band needed by the path to be changed on the basis of the traffic flow amount, as the log data, for each path collected in the network state DB 30DN.

On the basis of the available band of each link on the route assigned with the path that is the calculated candidate addition target and the estimated band needed by the path to be changed, if a total amount of the required band for the path to be changed is equal to or less than the available band of each link, the update determination unit 30PA determines that it is possible to add all the traffic of the path to be changed to the other path.

Specifically, it is assumed that the log is collected as in FIG. 13, and in a link between the relay apparatus 13/port #2 and the relay apparatus 14/port #1 on the route 1001 assigned with the path 10001 that is the candidate addition target from the log data, the total value of the traffic flow amounts of all the paths passing through that link is 4.5 Gbps. In addition, if the physical band of the relay apparatus 13/port #2 and the relay apparatus 14/port #1 is 5 Gbps, the available band of that link is calculated as 5 Gpbs–4.5 Gbps=0.5 Gbps. Further, it is also assumed that the required band for the path 10002 to be changed is estimated to be 1 Gbps on the basis of the log data.

At this time, the required band of 1 Gbps exceeds the available band of 0.5 Gbps of the ports of the relay apparatus 13 and the relay apparatus 14 and if the traffic of the path 10002 is transferred on the route 2001 passing through the relay apparatus 13 and the relay apparatus 14, the packet may be discarded, and thus, the update determination unit 30PA determines that it is not possible to add all the traffic of the path to be changed to the other path. Thus, if it is not possible to add the traffic to any path, the control of the network controller 30 proceeds to procedure S204.

Second Specific Example: Example 2 Using Traffic Flow Amount

The update determination unit 30PA determines whether it is possible to add some of the traffic of the path to be changed to another path. The update determination unit 30PA reads the log data from the network state DB 30DN, and calculates, on the basis of the traffic flow amount, as the log data, for each link collected in the network state DB 30DN, a total value of the traffic flow amounts of all the paths of each link on the route assigned with the path that is the candidate addition target and the available band thereof, and a total value of the traffic flow amounts of all the paths of each link on the route assigned with the path to be changed and the available band thereof. The required band for the path to be changed is estimated on the basis of the traffic flow amount for each path collected, as the log data, in the network state DB 30DN.

On the basis of the calculated available band of each link on the route assigned with the path that is the candidate addition target, the available band of each link on the route assigned with the path to be changed, and the estimated required band for the path to be changed, the update determination unit 30PA determines that it is possible to add some of the traffic of the path to be changed to the other path if the available band of each link on the route assigned with the path to be changed is equal to or more than a part of the required band for the path to be changed, and a total amount of the available band of each link on the route assigned with the path that is the candidate addition target and a remaining required band for the path to be changed is equal to or more than the available band of each link.

Specifically, it is assumed that the log is collected as in FIG. 13, and in a link between the relay apparatus 13/port #2 and the relay apparatus 14/port #1 on the route 1001 assigned with the path 10001 that is the candidate addition target from the log data, the total value of the traffic flow amounts of all the paths passing through that link is 7 Gbps. In addition, if the physical band of the relay apparatus 13/port #2 and the relay apparatus 14/port #1 is 10 Gbps, the available band of that link is calculated as 10 Gpbs–7 Gbps=3 Gbps. It is assumed that in a link between the relay apparatus 25/port #2 and the relay apparatus 26/port #1 on the route 2002 assigned with the path 10002 that is the candidate addition target, the total value of the traffic flow amounts of all the paths passing through that link is 700

Mbps. In addition, if the physical band of the relay apparatus 25/port #2 and the relay apparatus 26/port #1 is 1 Gbps, the available band of that link is calculated as 1 Gpbs−700 Mbps=300 Mbps. Further, it is also assumed that the required band for the path 10002 to be changed is estimated to be 500 Mbps on the basis of the log data. If a user of the end terminal permits the processing in which 300 Mbps of traffic, which is some of the required band for the path 10002 is processed in the path 10002 (route 2002), and 200 Mbps of traffic, which is the remaining band of the path 10002 is added to the path 10001, and such a load balance is possible, the update determination unit 30PA determines that it is not necessary to switch to a new route even when the communication quality of the path 10002 is deteriorated.

Thus, if it is possible to apply the load balance to the traffic of the path to be changed between the path 10001 and the path 10002 so that 300 Mbps of the available band of the link on the route 2002 assigned with the path 10002 to be changed is equal to or more than a part of the required band (300 Mpbs) of the path 10002, and a total amount of 3 Gbps of the available band of the link on the route 1001 assigned with the path 10001 that is the candidate addition target and the remaining required band (200 Mbps) of the path 10002 is equal to or more than the available band of each link, the update determination unit 30PA determines that it is not necessary to assign the path 10002 to a new route. At this time, the control of the network controller 30 proceeds to procedure S201.

Specific Example of Procedure S204 (Route Calculation)

Figure 14:
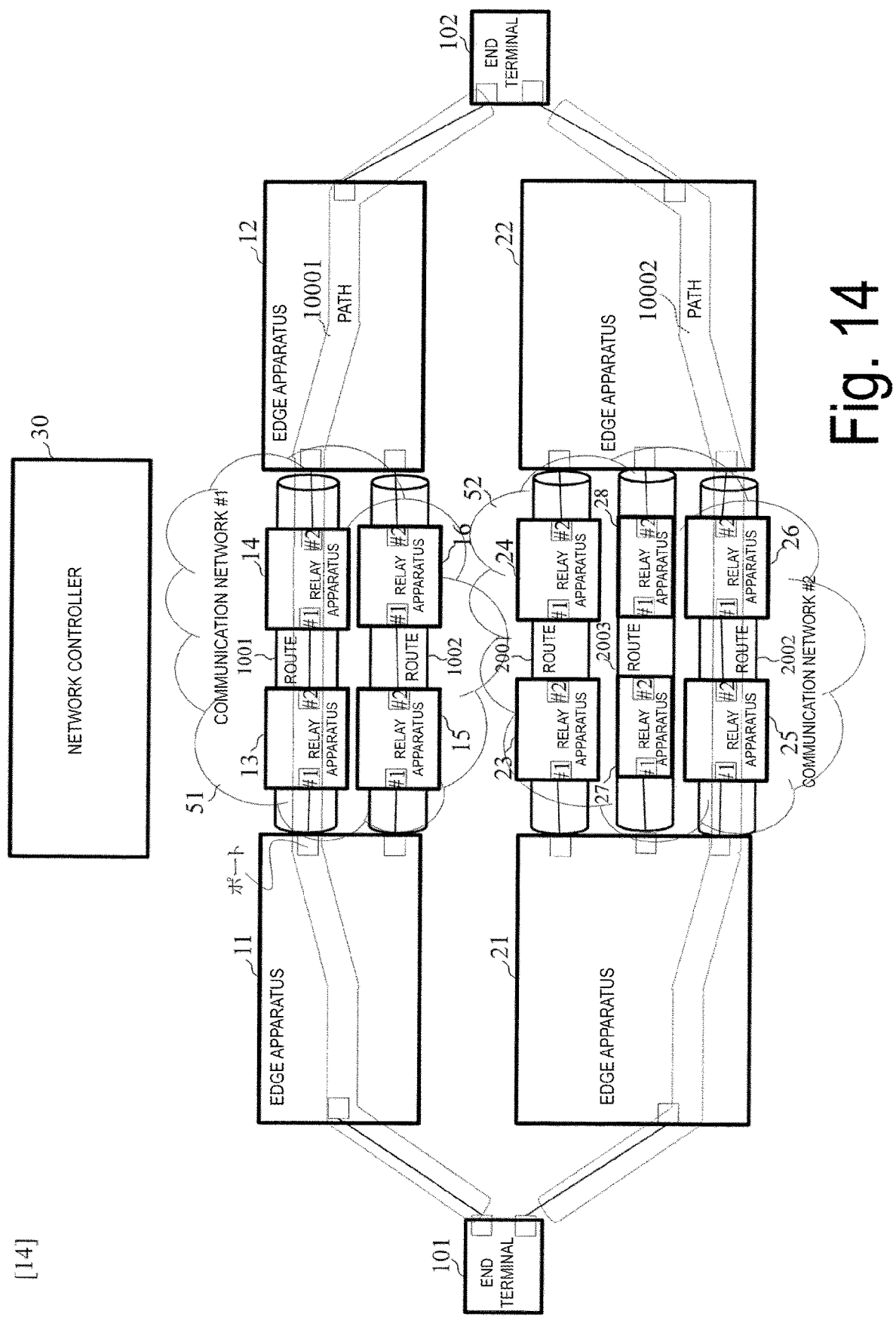
FIG. 14 is a diagram illustrating an example of calculating a new route.

In procedure S204, the route calculation unit 30PP of the network controller 30 calculates, on the basis of the log data collected in the network state DB 30DN (the required band for each path and the available band of each link) and a requirement condition of each path (a latency time and the like), a new route different from the route of the path to be changed. Note that as long as it is possible to calculate the route that can satisfy the communication quality between the end terminals, any calculation means may be employed. A specific example will be described below with reference to FIG. 14.

In a communication network #2 including three routes 2001, 2002, and 2003, the path 10002 assigned to the route 2002 is changed to be assigned to either the route 2001 or the route 2003. In selecting an assignment change destination, a route that is less likely to affect the communication quality of another user passing through each of the route 2001 and the route 2003 is selected from the route 2001 and the route 2003. In the present embodiment, in an example, a new route is determined on the basis of the required band for the path 10002 and the available band of each link within the communication network #2.

For example, it is assumed that the required band for the path 10002 is 40 Mbps and in a link between a relay apparatus 23/port #2 and a relay apparatus 24/port #1 on the route 2001, a total value of the traffic flow amounts of all the paths passing through that link is 800 Mbps. Further, it is assumed that the physical band of the relay apparatus 23/port #2 and the relay apparatus 24/port #1 is 1 Gbps. In this case, the available band of the link is calculated as 1 Gpbs−800 Mbps=200 Mbps.

On the other hand, it is assumed that in a link between a relay apparatus 27/port #2 and a relay apparatus 28/port #1 on the route 2003, a total value of the traffic flow amounts of all the paths passing through that link is 200 Mbps. Further, it is assumed that the physical band of the relay apparatus 23/port #2 and the relay apparatus 24/port #1 is 1 Gbps. In this case, the available band of the link is calculated as 1 Gpbs−200 Mbps=800 Mbps.

At that time, the route calculation unit 30PP determines that when the path 10002 to be changed is assigned to the route 2003 having a larger available band than the route 2001, a possibility of being less likely to affect another user is increased. As a result, the route calculation unit 30PP can use the route 2003 less affecting the communication quality of another end terminal, out of the routes 2001 and 2003 different from the route 2002 assigned with the deteriorated path 10002 to calculate a new path of the end terminal utilizing the deteriorated path 10002. Further, the calculated route 2001 is stored in the path and route DB 30DP shown in FIG. 15.

Specific Example of Procedure S205 (Route Setting)

Procedure S205 is a procedure of notifying, by the apparatus communication unit 30CA of the network controller 30, the edge apparatus of information about a new route of the calculated path, where the edge apparatus passes through that path. Note that as long as it is possible to notify the edge apparatus of the information about the route, any route setting means may be employed.

First Specific Example: Example Using OpenFlow

In receiving a user packet transmitted from the end terminal 101, the network controller 30 corrects a flow entry so that the edge apparatus 21 outputs the packet to a port connected to the relay apparatus 23 rather than the relay apparatus 25.

Example of Control of Edge Apparatus

Next, an example of a control in the edge apparatus 11 will be described. Note that similar operations are also performed in the other edge apparatuses 12, 21, and 22. The edge apparatus 11 receives, from the network controller 30, any type of route information indicating that the path 10001 is assigned to the route 1002. The edge apparatus 11 stores the received route information in the path and route DB 11D. On the basis of the stored information, in receiving a user packet of the path 10001 from the end terminal 101, the edge apparatus 11 outputs the user packet to the port connected to the relay apparatus 15. Further, in receiving the user packet of the path 10001 from the relay apparatus 15, the edge apparatus 11 outputs the user packet to the port connected to the end terminal 101.

Example of Control of End Terminal

An example of a control in the end terminal 101 and the end terminal 102 will be described. The end terminal 101 and the end terminal 102 manage the path 10001 and the path 10002. In transmitting and receiving a packet in each of the path 10001 and the path 10002, each end terminal understands the communication quality (the latency time, the jitter value, and the number of packet losses). On the basis of the communication quality of each path, each end terminal determines a type and a flow amount of traffic transferred in each of the paths 10001 and 10002. In measuring an increase in latency time of a transmission and reception result of the packet in the path 10002 due to an increase and the like of the traffic flow amount between the relay apparatus 25 and the relay apparatus 26, for example, the end terminal 101 and the end terminal 102 perform a control so that a packet of a real-time communication protocol (such as rtp) is transferred in the path 10001 and a packet of a protocol other than the above protocol is transferred in the path 10002.

Example of Control of Relay Apparatus

In the example of the control in the relay apparatus, an existing routing process of determining a destination on the basis of the header information of the packet is performed during either a normal operation or variation, and thus, a detailed description will not be provided.

Note that the apparatus according to the present disclosure can be implemented using a computer and a program, and the program can be recorded on a recording medium or provided through a network.

Effects

The present disclosure includes a network configuration including the network controller 30 that acquires states of all the communication networks (the communication network 51 and the communication network 52) and calculates a new route assignment from the information, and the edge apparatuses 11, 12, 21, and 22 that assign a route on the basis of the information obtained from the network controller 30. As a result, in the present disclosure, when the route assignment of the path 10002 is changed from the route 2002 to the route 2001 in response to the traffic variation between the relay apparatus 25 and the relay apparatus 26, it is possible to maintain the communication quality between the end terminal 101 and the end terminal 102.

In addition, in procedure S202 and procedure S203 of the network controller 30, the network controller 30 controls so that the route assignment of the path 10002 is least likely to be changed if it is possible to maintain the communication quality between the end terminal 101 and the end terminal 102 over all the communication network 51 and the communication network 52. Thus, in the present disclosure, it is possible to prevent a change of a band design within the communication network 52. When it is determined that the traffic of the path 10002 can be processed in the path 10001, it is possible to prevent a change of the route assignment of the path 10002 from the route 2002 to the route 2001 to stably maintain the communication quality of another user using the route 2002 and the route 2001.

INDUSTRIAL APPLICABILITY

The present disclosure can be applied in the information communication industry.

REFERENCE SIGNS LIST 11, 12, 17, 18, 21, 22: Edge apparatus
13, 14, 15, 16, 23, 24, 25, 26, 27, 28: Relay apparatus
30: Network controller
51, 52: Communication network
11C, 12C, 21C, 22C: Controller communication unit
11D, 12D, 21D, 22D, 30DP: Path and route DB
11P 12P, 21P, 22P: Transfer determination unit
11T 12T, 21T, 22T: Data transmission unit
11R, 12R, 21R, 22R: Data reception unit
101, 102, 201, 202: End terminal
30DN: Network state DB
30PA: Update determination unit
30PP: Route calculation unit
30CL: Log reception unit
30CA: Apparatus communication unit
300: SD-WAN controller
101, 102, 201, 202: End terminal
1001, 1002, 2001, 2002, 2003: Route

The invention claimed is:

1. A network controller apparatus connected to a communication network that is configured to perform data communication between end terminals by using a plurality of paths, the network controller apparatus comprising:
a network state database configured to store log information about a communication state for each path of the plurality of paths collected from the communication network, wherein the network controller apparatus is configured to:
determine a capacity amount of a port of each of the end terminals;
determine, using the log information, an accumulated amount of a traffic flow amount and a discarded packet count across each path of the plurality of paths between the end terminals;
compare (i) the capacity amount of the port of each of the end terminals to (ii) the determined accumulated amount for each path of the plurality of paths;
determine a respective path exists with a deteriorated communication quality in response to determining the discarded packet count for the respective path exceeds a threshold value;
in response, determine whether a communication quality between end terminals utilizing the deteriorated path is guaranteed by using an additional path not utilized by another end terminal, from among other paths available to the end terminals utilizing the deteriorated path; and
set, as a new path of the end terminals utilizing the deteriorated path, the additional path to the communication network if the network controller apparatus determines that the communication quality between the end terminals utilizing the deteriorated path is guaranteed based on a capacity amount across each port of the end terminals across the additional path exceeds the accumulated amount of the traffic flow previously transferred across the additional path.

2. The network controller apparatus according to claim 1, wherein the network controller apparatus is configured to:
calculate a total value of a traffic flow amount of the additional path; and
if a traffic flow amount between the end terminals utilizing the deteriorated path is smaller than the total value, determine that the communication quality between the end terminals utilizing the deteriorated path is guaranteed.

3. The network controller apparatus according to claim 1, wherein the network controller apparatus is further configured to:
calculate a new path of the end terminals utilizing the deteriorated path by using a route different from a route assigned with the deteriorated path in response to determining that the communication quality between the end terminals utilizing the deteriorated path is not guaranteed; and
set, as a new path of the end terminals utilizing the deteriorated path, the new calculated path to the communication network.

4. The network controller apparatus according to claim 3, wherein the network controller apparatus is configured to calculate a new path of the end terminals utilizing the deteriorated path by using a route being less likely to affect a communication quality of another end terminal, from among routes different from the route assigned with the deteriorated path.

5. A network control system, comprising:
a network controller apparatus connected to a communication network that is configured to perform data communication between end terminals by using a plurality of paths, the network controller apparatus comprising:

a network state database configured to store log information about a communication state for each of the plurality of paths collected from the communication network, wherein the network controller apparatus is configured to:

determine a capacity amount of a port of each of the end terminals;

determine, using the log information, an accumulated amount of a traffic flow amount and a discarded packet count across each path of the plurality of paths between the end terminals;

compare (i) the capacity amount of the port of each of the end terminals to (ii) the determined accumulated amount for each path of the plurality of paths;

determine a respective path exists with a deteriorated communication quality in response to determining the discarded packet count for the respective path exceeds a threshold value;

in response, determine whether a communication quality between end terminals utilizing the deteriorated path is guaranteed by using an additional path not utilized by another end terminal, from among other paths available to the end terminals utilizing the deteriorated path; and set, as a new path of the end terminals utilizing the deteriorated path, the additional path to the communication network if the network controller apparatus determines that the communication quality between the end terminals utilizing the deteriorated path is guaranteed based on a capacity amount across each port of the end terminals across the additional path exceeding the accumulated amount of the traffic flow previously transferred across the additional path; and the communication network connected to the network controller apparatus, the communication network comprising:
a plurality of edge apparatuses each configured to house the end terminals; and
a plurality of relay apparatuses configured to transfer data between the plurality of edge apparatuses,
wherein the network controller apparatus is configured to notify edge apparatuses housing the end terminals utilizing the deteriorated path of switching to the new path, and
the plurality of edge apparatuses are configured to switch to the new path according to the notification from the network controller apparatus.

6. The network control system according to claim 5, wherein the network controller apparatus is configured to:
calculate a total value of a traffic flow amount of the additional path; and
if a traffic flow amount between the end terminals utilizing the deteriorated path is smaller than the total value, determine that the communication quality between the end terminals utilizing the deteriorated path is guaranteed.

7. The network control system according to claim 5, wherein the network controller apparatus is further configured to:
calculate a new path of the end terminals utilizing the deteriorated path by using a route different from a route assigned with the deteriorated path in response to determining that the communication quality between the end terminals utilizing the deteriorated path is not guaranteed; and set, as a new path of the end terminals utilizing the deteriorated path, the calculated new path to the communication network.

8. The network control system according to claim 7, wherein the network controller apparatus is configured to:
calculate a new path of the end terminals utilizing the deteriorated path by using a route being less likely to affect a communication quality of another end terminal, from among routes different from the route assigned with the deteriorated path.

9. A method of controlling a communication network, the method being executed by a network controller connected to a communication network where data communication between end terminals is performed by using a plurality of paths, the method comprising:
collecting, by the network controller, log information of a communication state for each of the plurality of paths;
determining, by the network controller, a capacity amount of a port of each of the end terminals;
determining, using the log information and by the network controller, an accumulated amount of a traffic flow amount and a discarded packet count across each path of the plurality of paths between the end terminals;
comparing, by the network controller, (i) the capacity amount of the port of each of the end terminals to (ii) the determined accumulated amount for each path of the plurality of paths;
determining, by the network controller, a respective path exists with a deteriorated communication quality in response to determining the discarded packet count for the respective path exceeds a threshold value;
in response, determining, by the network controller, whether a communication quality between end terminals utilizing the deteriorated path is guaranteed by using an additional path not utilized by another end terminal, from among other paths available to the end terminals utilizing the deteriorated path; and
setting, by the network controller, as a new path of the end terminals utilizing the deteriorated path, the additional path to the communication network if it is determined that the communication quality between the end terminals utilizing the deteriorated path is guaranteed based on a capacity amount across each port of the end terminals across the additional path exceeds the accumulated amount of the traffic flow previously transferred across the additional path.

10. The method of controlling a communication network according to claim 9, wherein:
calculating, by the network controller, a new path of the end terminals utilizing the deteriorated path by using a route different from a route assigned with the deteriorated path if it is determined that the communication quality between the end terminals utilizing the deteriorated path is not guaranteed; and
setting, by the network controller, as a new path of the end terminals utilizing the deteriorated path, the new calculated path to the communication network.

11. The method of controlling a communication network according to claim 10, wherein:
calculating, by the network controller, a new path of the end terminals utilizing the deteriorated path by using a route being less likely to affect a communication quality of another end terminal, from among routes different from the route assigned with the deteriorated path.

12. The method of controlling a communication network according to claim 9, wherein:

calculating, by the network controller, a total value of a traffic flow amount of the additional path; and if a traffic flow amount between the end terminals utilizing the deteriorated path is smaller than the total value, determining, by the network controller, that the communication quality between the end terminals utilizing the deteriorated path is guaranteed.

* * * * *